(12) United States Patent
Steely et al.

(10) Patent No.: US 9,251,073 B2
(45) Date of Patent: Feb. 2, 2016

(54) UPDATE MASK FOR HANDLING INTERACTION BETWEEN FILLS AND UPDATES

(71) Applicant: Intel Corporation, Santa Clara, CA (US)

(72) Inventors: Simon C. Steely, Hudson, NH (US); William C. Hasenplaugh, Boston, MA (US)

(73) Assignee: Intel Corporation, Santa Clara, CA (US)

( * ) Notice: Subject to any disclaimer, the term of this patent is extended or adjusted under 35 U.S.C. 154(b) by 366 days.

(21) Appl. No.: 13/732,242

(22) Filed: Dec. 31, 2012

(65) Prior Publication Data

US 2014/0189251 A1    Jul. 3, 2014

(51) Int. Cl.
*G06F 12/00* (2006.01)
*G06F 12/08* (2006.01)

(52) U.S. Cl.
CPC ........ *G06F 12/0828* (2013.01); *G06F 12/0811* (2013.01); *G06F 12/0886* (2013.01)

(58) Field of Classification Search
CPC .......................... G06F 12/126; G06F 12/0815
See application file for complete search history.

(56) References Cited

U.S. PATENT DOCUMENTS

| | | |
|---|---|---|
| 5,297,269 A | 3/1994 | Donaldson et al. |
| 5,765,195 A | 6/1998 | McDonald |
| 5,796,605 A | 8/1998 | Hagersten |
| 5,887,146 A | 3/1999 | Baxter et al. |
| 5,953,538 A | 9/1999 | Duncan et al. |
| 6,012,120 A | 1/2000 | Duncan et al. |
| 6,021,456 A | 2/2000 | Herdeg et al. |
| 6,026,461 A | 2/2000 | Baxter et al. |
| 6,128,711 A | 10/2000 | Duncan et al. |
| 6,167,489 A | 12/2000 | Bauman et al. |
| 6,353,877 B1 | 3/2002 | Duncan et al. |
| 6,415,364 B1 | 7/2002 | Bauman et al. |
| 6,438,659 B1 | 8/2002 | Bauman et al. |
| 6,587,931 B1 | 7/2003 | Bauman et al. |
| 6,606,676 B1 | 8/2003 | Deshpande et al. |
| 6,751,721 B1 | 6/2004 | Webb, Jr. et al. |
| 6,961,825 B2 | 11/2005 | Steely, Jr. et al. |
| 7,076,597 B2 | 7/2006 | Webb, Jr. et al. |
| 7,373,462 B2 | 5/2008 | Blumrich et al. |
| 7,380,071 B2 | 5/2008 | Blumrich et al. |
| 7,386,683 B2 | 6/2008 | Blumrich et al. |
| 7,392,351 B2 | 6/2008 | Blumrich et al. |
| 7,603,523 B2 | 10/2009 | Blumrich et al. |
| 7,925,840 B2 | 4/2011 | Harris et al. |
| 8,103,836 B2 | 1/2012 | Blumrich et al. |
| 8,117,394 B2 | 2/2012 | Basham et al. |

(Continued)

*Primary Examiner* — Kevin Verbrugge
*Assistant Examiner* — Arvind Talukdar
(74) *Attorney, Agent, or Firm* — Trop, Pruner & Hu, P.C.

(57) ABSTRACT

A multi core processor implements a cash coherency protocol in which probe messages are address-ordered on a probe channel while responses are un-ordered on a response channel. When a first core generates a read of an address that misses in the first core's cache, a line fill is initiated. If a second core is writing the same address, the second core generates an update on the addressed ordered probe channel. The second core's update may arrive before or after the first core's line fill returns. If the update arrived before the fill returned, a mask is maintained to indicate which portions of the line were modified by the update so that the late arriving line fill only modifies portions of the line that were unaffected by the earlier-arriving update.

21 Claims, 8 Drawing Sheets

(56) References Cited

U.S. PATENT DOCUMENTS

| | | |
|---|---|---|
| 8,135,917 B2 | 3/2012 | Blumrich et al. |
| 8,255,638 B2 | 8/2012 | Blumrich et al. |
| 8,266,386 B2 | 9/2012 | Drerup |
| 2002/0099833 A1 | 7/2002 | Steely, Jr. et al. |
| 2004/0039880 A1 | 2/2004 | Pentkovski et al. |
| 2004/0073755 A1 | 4/2004 | Webb, Jr. et al. |
| 2005/0010615 A1* | 1/2005 | Cypher ............... G06F 12/0817 |
| 2006/0095679 A1 | 5/2006 | Edirisooriya |
| 2006/0224835 A1 | 10/2006 | Blumrich et al. |
| 2006/0224836 A1 | 10/2006 | Blumrich et al. |
| 2006/0224837 A1 | 10/2006 | Blumrich et al. |
| 2006/0224838 A1 | 10/2006 | Blumrich et al. |
| 2006/0294319 A1 | 12/2006 | Mansell |
| 2007/0288725 A1* | 12/2007 | Luick ........................... 712/225 |
| 2008/0133846 A1 | 6/2008 | Brenner |
| 2008/0222364 A1 | 9/2008 | Blumrich et al. |
| 2008/0244194 A1 | 10/2008 | Blumrich et al. |
| 2009/0006770 A1 | 1/2009 | Blumrich et al. |
| 2009/0055596 A1 | 2/2009 | Wallach et al. |
| 2009/0070553 A1 | 3/2009 | Wallach et al. |
| 2009/0083493 A1 | 3/2009 | Kinter |
| 2009/0089511 A1* | 4/2009 | O'Krafka et al. ............. 711/143 |
| 2009/0112563 A1 | 4/2009 | Drerup |
| 2010/0030969 A1 | 2/2010 | Basham et al. |
| 2010/0064108 A1 | 3/2010 | Harris et al. |
| 2010/0169579 A1 | 7/2010 | Sheaffer et al. |
| 2010/0169581 A1 | 7/2010 | Sheaffer et al. |
| 2010/0180084 A1 | 7/2010 | Cypher |
| 2011/0307662 A1 | 12/2011 | Jacobi et al. |
| 2012/0117334 A1 | 5/2012 | Sheaffer et al. |
| 2012/0311272 A1 | 12/2012 | Blumrich et al. |
| 2013/0031314 A1 | 1/2013 | Kinter |
| 2014/0089600 A1* | 3/2014 | Biswas et al. .................. 711/141 |
| 2014/0089602 A1* | 3/2014 | Biswas et al. .................. 711/144 |

* cited by examiner

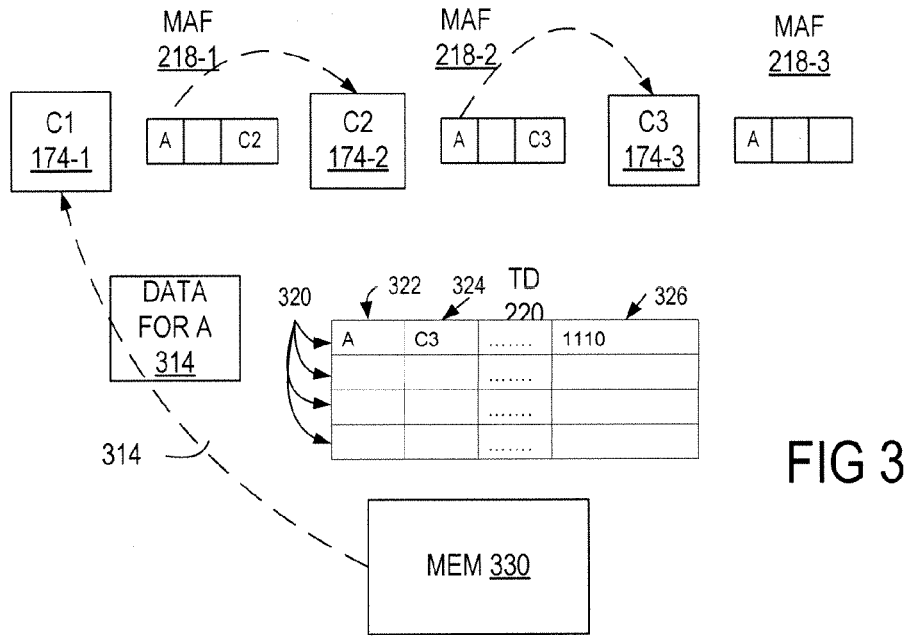
FIG 3
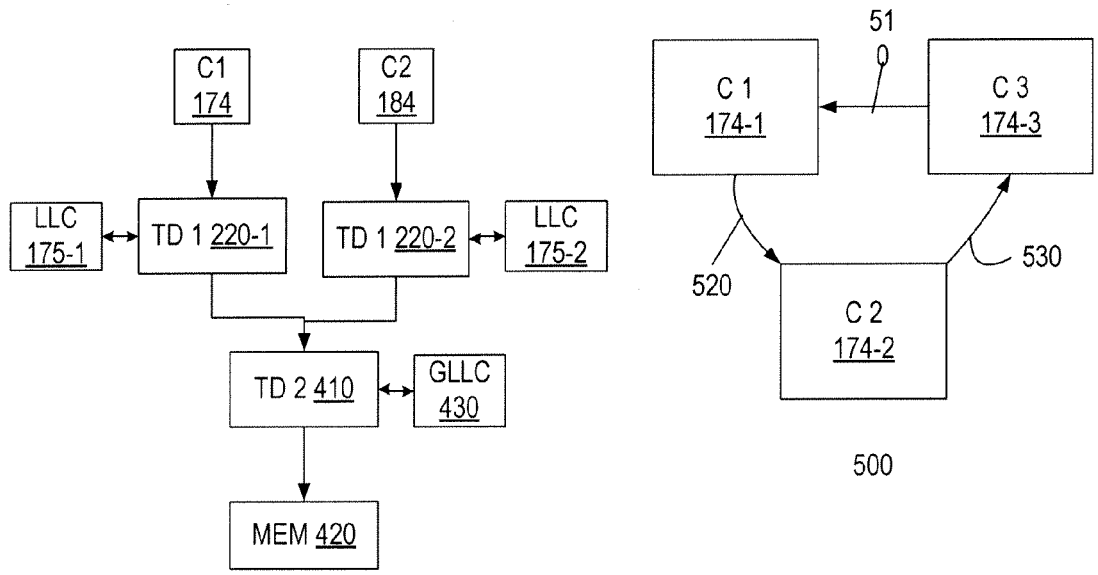
FIG 4
FIG 5

UPDATE MASK FOR HANDLING INTERACTION BETWEEN FILLS AND UPDATES

This invention was made with Government support under contract number H98230-11-3-0011 awarded by the Department of Defense. The Government has certain rights in this invention.

FIELD

The present disclosure relates to cache architecture in a processor, and in particular, for a write-update protocol extension to a channel based cache coherency protocol for handling interaction between fills and updates arriving out of order.

BACKGROUND

In a shared-memory multiprocessor system with a separate cache memory for each processor or core, cache coherency must be maintained to ensure that changes in the values of shared operands are propagated throughout the coherency system to maintain the consistency of data stored in local caches of a shared resource. As more cores are integrated on a socket, the number of outstanding requests that the memory hierarchy and coherence system has to handle also grows because each tag directory entry needs to maintain and track each additional core. A cache coherency protocol may be implemented to maintain the property that all reads to a cache obtain the latest value for all of the caches in a distributed shared-memory system.

BRIEF DESCRIPTION OF THE DRAWINGS

FIG. 3 is a representation of an exemplary chaining of requests for a specific memory address among multiple cores in a cache coherency protocol.

FIG. 4 is a block diagram of a path of communication for first access in a cache coherency protocol in the case that a request that misses in the core cache and must go to the memory.

FIG. 5 is a block diagram of the implementation of the cache coherency protocol using channels.

DESCRIPTION OF THE EMBODIMENT(S)

Figure 1:
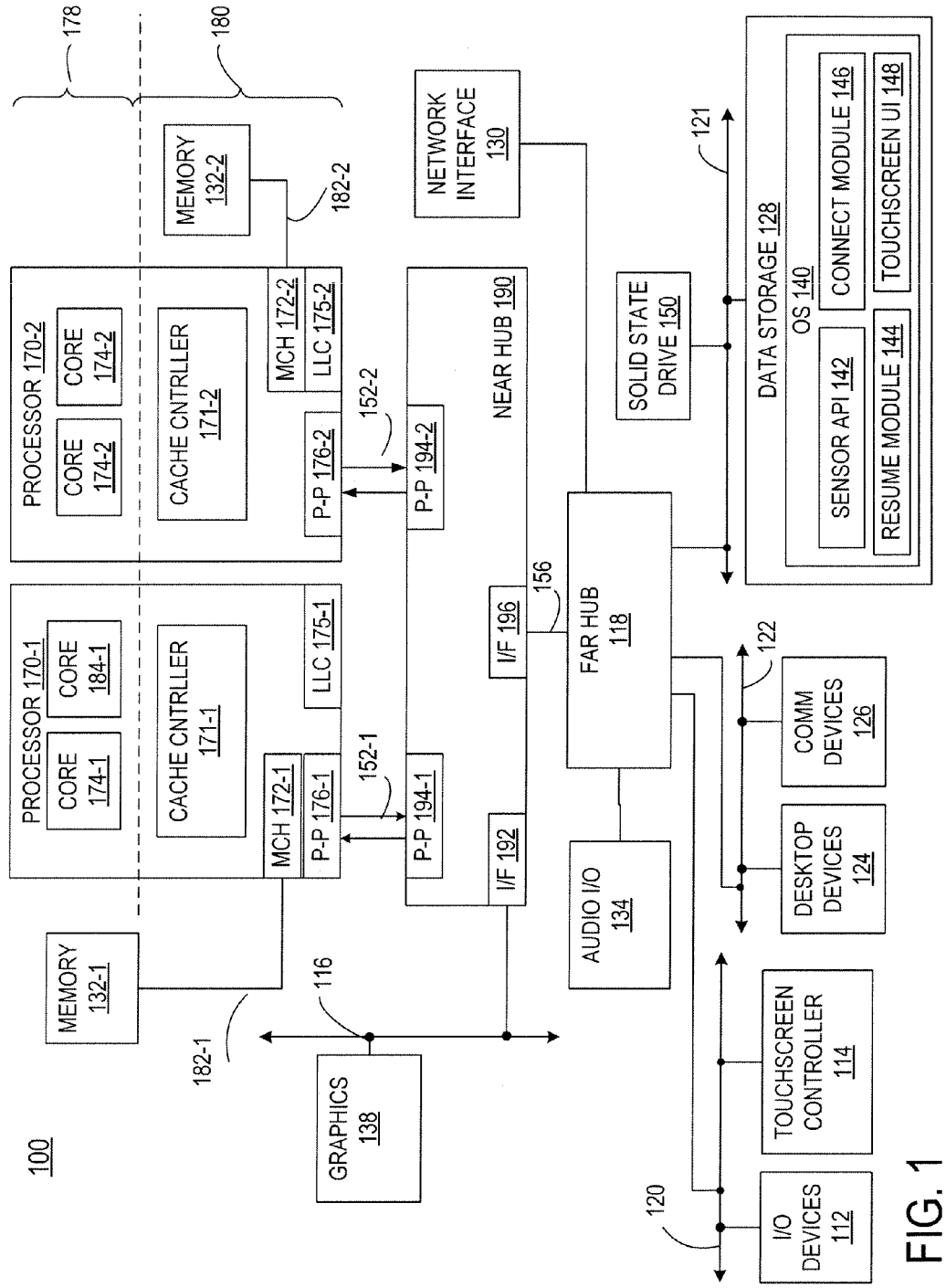
FIG. 1 is a block diagram describing elements of an embodiment of a multiprocessor system.

Embodiments of disclosed subject matter pertain to the use of scalable cache protocols in a multiprocessor shared-memory system. In some embodiments, disclosed scalable cache coherence protocols are suitable for use in conjunction with moderate to large scale shared-memory multiprocessors.

At least one embodiment of a scalable cache coherency protocol, referred to herein as a hierarchical scalable protocol (HSP), is suitable for use in a shared-memory multiprocessor because embodiments of the protocol possess one or more of the following characteristics: free of dead locks, i.e., every request is processed eventually; free of live locks, i.e., progress can be made from any state that the system generates; fairness with respect to each core, e.g., no core is starved of cache space; low occupancy, i.e., messages are processed quickly enough to prevent excessive queuing; low resource overhead, i.e., required resources do not scale linearly with the number of cores, efficiency, e.g., the number of messages required to complete transactions, and structural scalability, the number of operations and bookkeeping resources are not strictly dependent on the number of cores. While disclosed embodiments employ an HSP, other embodiments may employ different coherency protocols.

In at least one embodiment, an HSP processes all coherence ordering points atomically and maintains an ordered chain of all uncompleted requests to a particular address. The ordered chain enables coherency logic to complete processing of requests from multiple accessors in the ordered determined by the applicable coherence ordering point. In some embodiments, hierarchy is used in the organization of tag directories to reduce data communication latency and provide a scalable representation of data storage.

In at least one embodiment, an HSP includes a mechanism to track a final value of a cache line in the specific case of a read request co-existing with a forwarded write update involving the same cache line. A line fill may arrive before or after subsequent updates. In the case of the fill arriving after subsequent updates, the late arriving fill must not overwrite updated data in the cache.

In some embodiments, a scalable coherency protocol for use in conjunction with a multiprocessor may include any one or more of the following features: non-blocking tag directory processing, an address-ordered probe channel, maintaining a line in a temporary state following a fill until the line validated after all outstanding coherence actions complete, last-accessor-managed tag directory entries that limit the number of probes that could possibly match an outstanding entry in a miss address file (MAF), and use of single ownership to manage writes in a coherent manner.

In at least one embodiment, the coherency protocol implements a write update extension that allows writes to be performed by sending the write data to all copies of the data and updating them. A write update protocol extension will save energy and allow more time to perform the same communication. It is to be noted, that while a HSP has been exemplified in this disclosure, other scalable cache coherency protocols with similar attributes may be applicable.

At least one embodiment pertains to a method of updating a mask for handling interaction between fills and updates arriving out of order. Some embodiments of the method implement by a write update extension. In response to detecting a read request from a first entity referencing a specific memory address that misses in a core cache of the first entity, an order-marker corresponding to the read request to the first entity is sent on a first channel. In some embodiments, a fill corresponding to the read request may be sent on a second channel. The order marker may be sent on an address ordered probe channel, while the fill may be sent on an un-ordered response channel. In some embodiments, a bit in an entry of a MAF may indicate that the read request order-marker has arrived.

Some embodiments may respond to detection of an update request referencing a specific memory address, ordered at a tag directory after the read request, by sending update data (upd) packets on the first channel to all non-last accessor entities having copies of the specific memory address. Additionally, some embodiments may send a last accessor probe update data packet on the first channel if the last accessor entity is different than the second entity. All probe channel packets are processed immediately upon arrival, thereby probe channels never stall due to coherency dependencies. Lastly, in response to the update request referencing a specific memory address, an update acknowledgement (upd_ack) is sent to the second entity.

In some embodiments, the update request sets update mask bits in a corresponding entry of the MAF. The update mask bit may indicate portion of a cache line corresponding to a specific memory address that was updated. Once an update mask has been created and the read request order-marker arrives before the probe request, a fill is prevented from overwriting the updated data. In at least one embodiment, the write update extension allows the fill to be first merged with prior updates and then written selectively to the non-updated portions of the cache line. Upon updating of the cache line, some embodiments send an update acknowledgement (upd_ack) to the first entity that initiated the update request if a probe request has been recorded during the probe processing phase of the MAF entry.

In at least one embodiment, a processor includes multiple cores, each containing a front end unit, an execution unit, a core cache, and storage to record information for a miss address file. In some embodiments, the processor includes an uncore region that includes a last level cache and a cache controller, containing a tag directory.

In some embodiments, the processor is operable to perform a novel write update protocol extension by an update mask to handle interaction between fills and updates arriving out of order. Embodiments of the processor may be operable to respond to detecting a read request referencing a memory address from a first entity that misses in a core cache of the first entity, by sending an order-marker corresponding to the read request to the first entity on a first channel and sending a fill corresponding to the read request to the first entity on a second channel.

Additionally, some embodiments of the processor respond to detecting an update request referencing the same memory address, but ordered after the read request, by sending update data (upd) packets on the first channel to all non-last accessor entities having copies of the memory address, sending a last accessor update (upd_LA) packet on the first channel if the last accessor entity is different than the second entity and also sending an update acknowledgement (upd_ack) to the second entity.

At least one embodiment of the processor allows the update request to set update mask bits in a corresponding MAF entry. In some embodiments, the write update extension allows a fill to be first merged with prior updates and then write selectively to the non-updated portions of the cache line. Upon updating the cache line, an update acknowledgement (upd_ack) is sent to the first entity that initiated the update request if a probe request has been recorded during the probe processing phase of the MAF entry.

In at least one embodiment, a disclosed multiprocessor system includes a plurality of multicore processors, a last level cache, and a cache controller with a tag directory. In some embodiments, each core includes a front end unit, an execution unit, a core cache, and a miss address file (MAF). Embodiments of the cache controller maintain a tag directory which may keep track of all the sharers and this bit vector increases by one bit per core as the number of cores increases, but only stores one location for the last accessor which does not increase by increasing the number of cores.

In some embodiments, the system is operable to perform a novel write update protocol extension by an update mask for handling interaction between fills and updates arriving out of order. The system, in response to detection of a read request referencing a specific memory address from a first entity that misses in a core cache of the first entity, sends an order-marker corresponding to the read request to the first entity on a first channel and sends a fill corresponding to the read request to the first entity on a second channel.

In at least one embodiment, the system is operable to detecting an update request referencing a specific memory address ordered after the read request and respond by sending update data (upd) packets on the first channel to all non-last accessor entities having copies of the specific memory address, sending last accessor update (upd_LA) packets on the first channel if the last accessor entity is different than the second entity and also send an update acknowledgement (upd_ack) to the second entity.

In some embodiments, the system allows an update request to set updated mask bits in a corresponding MAF entry. The write update extension allows the fill to be first merged with prior updates and then write selectively to the non-updated portions of the cache line. Upon updating of the cache line, an update acknowledgement (upd_ack) is sent to the first entity that initiated the update request if a probe request has been recorded during the probe processing phase of the MAF entry.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, for example, widget 12-1 refers to an instance of a widget class, which may be referred to collectively as widgets 12 and any one of which may be referred to generically as a widget 12.

Embodiments may be implemented in many different types of systems and platforms. Referring now to FIG. 1, a block diagram of selected elements of a multiprocessor system in accordance with an embodiment of the present disclosure. FIG. 1 shows a system in which a first multi-core processor, a second multi-core processor, memory, and input/output devices are interconnected by a number of point-to-point (P-P) interfaces, as will be described in further detail. However, in other embodiments (not shown in FIG. 1) the multiprocessor system may employ different bus architectures, such as a front side bus, a multi-drop bus, and/or another implementation. Although two processors are depicted in the example embodiment of FIG. 1 for descriptive clarity, in various embodiments, a different number of processors may be employed using elements of the depicted architecture.

As shown in FIG. 1, processor system 100 is a point-to-point interconnect system, and includes processors 170-1 and 170-2, whose internal components are individually referenced using like element numbers ending in -1 and -2, respectively. As shown in FIG. 1, processor 170-1 is a multi-core processor including first core 174-1 and second core 184-1. It is noted that other elements of processor 170-1 besides cores 174-1, 184-1 may be referred to as an uncore. In different embodiments (not shown in FIG. 1), a varying number of cores may be present in a particular processor. Cores 174-1, 184-1 may comprise a number of sub-elements (not shown in FIG. 1), also referred to as clusters, that provide different aspects of overall functionality. For example, cores 174-1, 184-1 may each include a memory cluster (not shown in FIG. 1) that may comprise one or more levels of cache memory. Other clusters (not shown in FIG. 1) in cores 174-1, 184-1 may include a front-end cluster and an execution cluster.

In particular embodiments, first core 174-1 and second core 184-1 within processor 170-1 are not equipped with direct means of communication with each other, but rather, communicate via cache controller 171-1, which may include intelligent functionality such as cache control, data queuing, P-P protocols, and multi-core interfacing. Cache controller 171-1 may thus represent an intelligent uncore controller that interconnects cores 174-1, 184-1 with memory controller hub (MCH) 172-1, last-level cache memory (LLC) 175-1, and P-P interfaces 176-1, 178-1. In particular, to improve performance in such an architecture, cache controller functionality within cache controller 171-1 may enable selective caching of data within a cache hierarchy including LLC 175-1 and one or more caches present in cores 174-1, 184-1. As shown in FIG. 1, cache controller 171-1 includes memory management unit (MMU) 173-1 that handles access to virtual memory addresses and maintains translation lookaside buffers (TLB) (not shown in FIG. 1) for improved performance with regard to memory access.

In FIG. 1, LLC 175-1 may be coupled to a pair of processor cores 174-1, 184-1, respectively. For example, LLC 175-1 may be shared by core 174-1 and core 184-1. LLC 175-1 may be fully shared such that any single one of cores 174-1, 184-1 may fill or access the full storage capacity of LLC 175-1. Additionally, MCH 172-1 may provide for direct access by processor 170-1 to memory 132-1 via memory interface 182-1. For example, memory 132-1 may be a double-data rate (DDR) type dynamic random-access memory (DRAM) while memory interface 182-1 and MCH 172-1 comply with a DDR interface specification. Memory 132-1 may represent a bank of memory interfaces (or slots) that may be populated with corresponding memory circuits for a desired DRAM capacity.

Also in FIG. 1, processor 170-1 may also communicate with other elements of the processor system 100, such as near hub 190 and far hub 118, which are also collectively referred to as a chipset that supports processor 170-1. P-P interface 176-1 may be used by processor 170-1 to communicate with near hub 190 via interconnect link 152-1. In certain embodiments, P-P interfaces 176-1, 194-1 and interconnect link 152-1 are implemented using Intel QuickPath Interconnect architecture.

As shown in FIG. 1, near hub 190 includes interface 192 to couple near hub 190 with first bus 116, which may support high-performance I/O with corresponding bus devices, such as graphics 138 and/or other bus devices. Graphics 138 may represent a high-performance graphics engine that outputs to a display device (not shown in FIG. 1). In one embodiment, first bus 116 is a Peripheral Component Interconnect (PCI) bus, such as a PCI Express (PCIe) bus and/or another computer expansion bus. Near hub 190 may also be coupled to far hub 118 at interface 196 via interconnect link 156. In certain embodiments, interface 196 is referred to as a south bridge. Far hub 118 may provide I/O interconnections for various computer system peripheral devices and interfaces and may provide backward compatibility with legacy computer system peripheral devices and interfaces. Thus, far hub 118 is shown providing network interface 130 and audio I/O 134, as well as, providing interfaces to second bus 120, third bus 122, and fourth bus 121, as will be described in further detail.

Second bus 120 may support expanded functionality for a processor system 100 with I/O devices 112, and may be a PCI-type computer bus. Third bus 122 may be a peripheral bus for end-user consumer devices, represented by desktop devices 124 and communication devices 126, which may include various types of keyboards, computer mice, communication devices, data storage devices, bus expansion devices, etc. In certain embodiments, third bus 122 represents a Universal Serial Bus (USB) or similar peripheral interconnect bus. Fourth bus 121 may represent a computer interface bus for connecting mass storage devices, such as hard disk drives, optical drives, disk arrays, which are generically represented by persistent storage 128, shown including OS 140 that may be executable by processor 170.

The FIG. 1 embodiment of system 100 emphasizes a computer system that incorporates various features that facilitate handheld or tablet type of operation and other features that facilitate laptop or desktop operation. In addition, the FIG. 1 embodiment of system 100 includes features that cooperate to aggressively conserve power while simultaneously reducing latency associated with traditional power conservation states.

The FIG. 1 embodiment of system 100 includes an operating system 140 that may be entirely or partially stored in a persistent storage 128. Operating system 140 may include various modules, application programming interfaces, and the like that expose to varying degrees various hardware and software features of system 100. The FIG. 1 embodiment of system 100 includes, for example, a sensor application programming interface (API) 142, a resume module 144, a connect module 146, and a touchscreen user interface 148. System 100 as depicted in FIG. 1 may further include various hardware/firm features include a capacitive or resistive touch screen controller 114 and a second source of persistent storage such as a solid state drive 150.

Sensor API 142 provides application program access to one or more sensors (not depicted) that may be included in system 100. Examples of sensors that system 100 might have include, as examples, an accelerometer, a global positioning system (GPS) device, a gyro meter, an inclinometer, and a light sensor. The resume module 144 may be implemented as software that, when executed, performs operations for reducing latency when transition system 100 from a power conservation state to an operating state. Resume module 144 may work in conjunction with the solid state drive (SSD) 150 to reduce the amount of SSD storage required when system 100 enters a power conservation mode. Resume module 144 may, for example, flush standby and temporary memory pages before transitioning to a sleep mode. By reducing the amount of system memory space that system 100 is required to preserve upon entering a low power state, resume module 144 beneficially reduces the amount of time required to perform the transition from the low power state to an operating state. The connect module 146 may include software instructions that, when executed, perform complementary functions for conserving power while reducing the amount of latency or delay associated with traditional "wake up" sequences. For example, connect module 146 may periodically update certain "dynamic" applications including, as examples, email and social network applications, so that, when system 100 wakes from a low power mode, the applications that are often most likely to require refreshing are up to date. The touchscreen user interface 148 supports a touchscreen controller 114 that enables user input via touchscreens traditionally reserved for handheld applications. In the FIG. 1 embodiment, the inclusion of touchscreen support in conjunction with support for communication devices 126 and the enable system 100 to provide features traditionally found in dedicated tablet devices as well as features found in dedicated laptop and desktop type systems.

Figure 2:
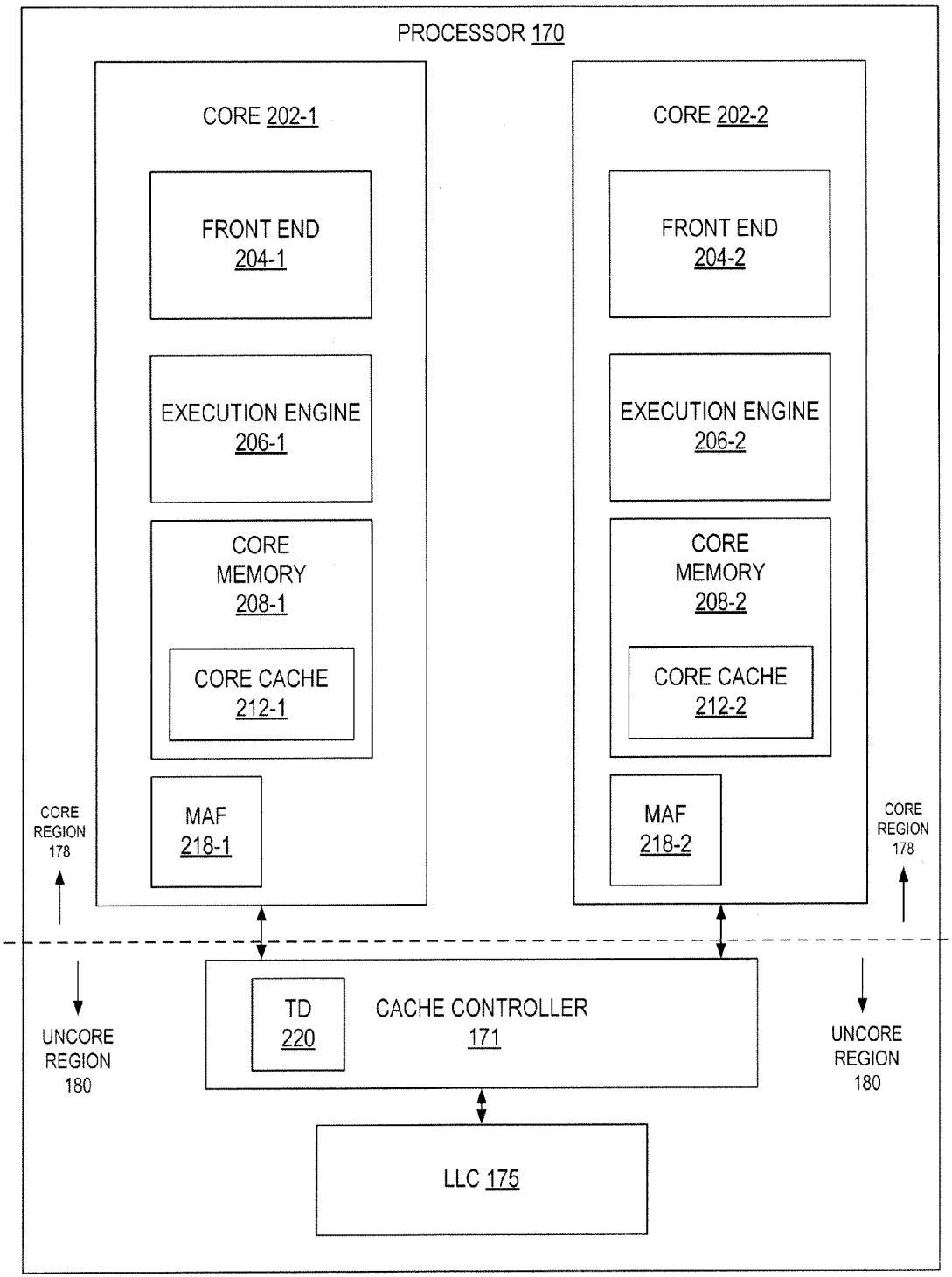
FIG. 2 is a block diagram of selected elements of an embodiment of a multi-core processor.

Referring now to FIG. 2, a block diagram of selected elements of processor 200 is shown. Processor 200 may be a multi-core processor including a plurality of processor cores. In FIG. 2, processor 200 is shown including first core 202-1 and second core 202-2, whose internal components are individually referenced using like element numbers ending in -1 and -2, respectively. It is noted that other elements of processor 200 besides cores 202 may be referred to as the uncore region 180. Although two cores are depicted in the example embodiment of FIG. 2 for descriptive clarity, in various embodiments, a different number of cores may be employed using elements of the depicted architecture. Cores 202 may comprise a number of sub-elements, also referred to as clusters, that provide different aspects of overall functionality. For example, cores 202 may each include front-end 204, execution engine 206, core memory 208 and miss address file (MAF) 218. This may be considered the core region 178 of the processor.

In FIG. 2, front-end 204 may be responsible for fetching instruction bytes and decoding those instruction bytes into micro-operations that execution engine 206 and/or core memory 208 consume. Thus, front-end 204 may be responsible for ensuring that a steady stream of micro-operations is fed to execution engine 206 and/or core memory 208. Execution engine 206 may be responsible for scheduling and executing micro-operations and may include buffers for reordering micro-operations and a number of execution ports (not shown in FIG. 2). Core memory 208 may include multiple levels of a cache hierarchy. Specifically, as shown in FIG. 2, core memory 208 may include a core cache 212. MAF 218 may be responsible for keeping track of pending misses.

In particular embodiments, first core 202-1 and second core 202-2 within processor 200 are not equipped with direct means of communicating with each other, but rather, communicate via cache controller 171, which may include intelligent functionality such as cache control, data queuing, P-P protocols, and multi-core interfacing. Cache controller 171 may include tag directory 220, which may keep track of all the sharers. Cache controller 171 may thus represent an intelligent uncore controller that interconnects cores 202 with LLC 175. This may be considered the uncore region 180 of the processor.

As shown in FIG. 2, processor 200 includes a last level cache (LLC) 175, which may be a higher-level cache that operates in conjunction with core cache 212. Thus, core cache 212 and LLC 175 may represent a cache hierarchy. During operation, memory requests from execution engine 206 may first access core cache 212 before looking up any other caches within a system. In the embodiment shown in FIG. 2, core cache 212 may be a final lookup point for each core 202 before a request is issued to LLC 175, which is a shared cache among cores 202.

Referring now to FIG. 3, a representation of an exemplary chaining of requests for a specific memory address among multiple cores in a cache coherency protocol. Hierarchical scalable protocol (HSP) may utilize chaining of requests and atomicity. Chaining may require some additional fields to be added to the MAF 218 structure that manages all outstanding requests from cores 174. Atomicity at the tag-directory 220 means that processing at the tag-directory runs ahead of the processing of the core 174. The tag directory 220 may keep track of all the sharers and this bit vector increases by one bit per core as we increase the number of cores, but only stores one location for the last accessor which does not increase by increasing the number of cores. The tag directory 220 stores a plurality of tracking information 320 for specific memory addresses 322, the last accessor 324, and the associated CV vector 326 including one bit per core, used to indicate which core(s) include a copy of the data.

Referring now to FIG. 4, a block diagram representative of a path of communication for first access in a cache coherency protocol in the case that a request that misses in the core cache and must go to the memory 420. A hierarchy of two levels, TD 1 220 and TD 2 410, where the first level may track all the cores in a domain and the second level tracks all the tag directories of a plurality of first levels. TD 1 220 may be associated with the LLC 175 of a processor, while TD 2 410 may be associated with a global LLC 430. A hierarchy may require the request to make two hops to go to memory since the first hop indicates the data is not present in the originating core 174 domain and the second hop indicates the data is not present in the multi-core domain, 174 and 184. Each of the tag directories may be smaller than the size of a traditional flat directory and, therefore, access latency is less.

Referring now to FIG. 5, a block diagram of the implementation of the cache coherency protocol using channels to process messages. The message channels and cores 174 are depicted in 500. VCReq 520 may carry all requests, VCResp 510 may carry all responses and acknowledgements and VcPrb 530 may carry all probes and invalidation messages. While VcReq 520 and VcResp 510 have no ordering constraints, VcPrb 530 may be required to maintain an address-ordering which means that all messages for a particular address travel in order from one source to one destination.

Figure 6:
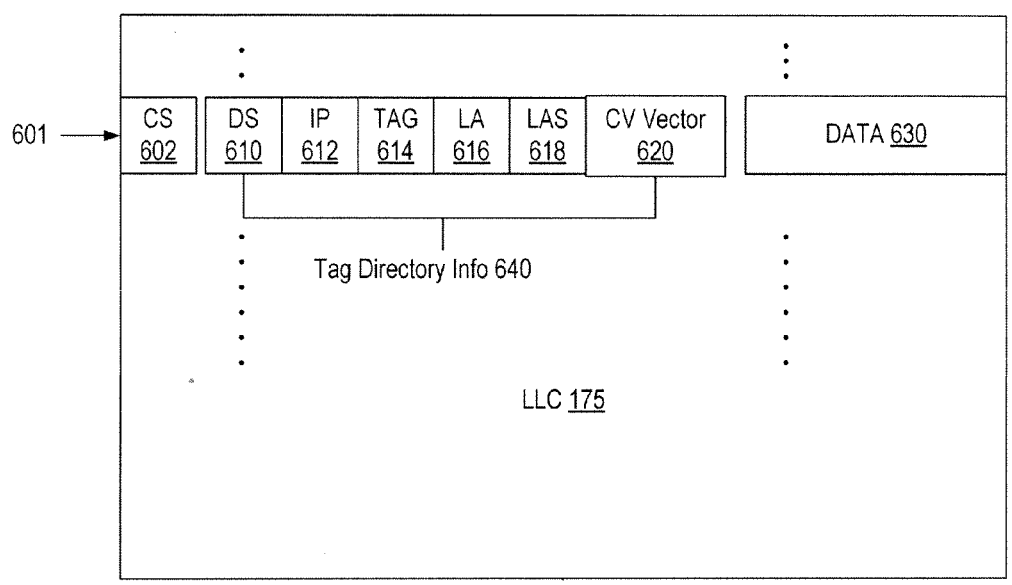
FIG. 6 is a block diagram of selected elements of an embodiment of a tag directory in a last-level cache.

Referring now to FIG. 6, a block diagram of selected elements of an embodiment of a tag directory in a last-level cache (LLC). LLC 175 may contain status information, tag directories 640 and data 630 for a plurality of specific memory addresses 601. Status information contained in the LLC 175 may include, but is not limited to, the coherency status 602. Tag directory information 640 may include, but is not limited to, domain state (DS) 610, in progress (IP) 612, tag field 614, last accessor 616, last accessor state 618 and core valid vector 620. Tag field 614 specifies the particular line being described by this entry. Last accessor 616 keeps track of the last entity to touch this line, while last accessor state 618 keeps track of the state of the last entity. The core valid vector 620 is a bit vector that denotes all the sharers of the line.

Figure 7:
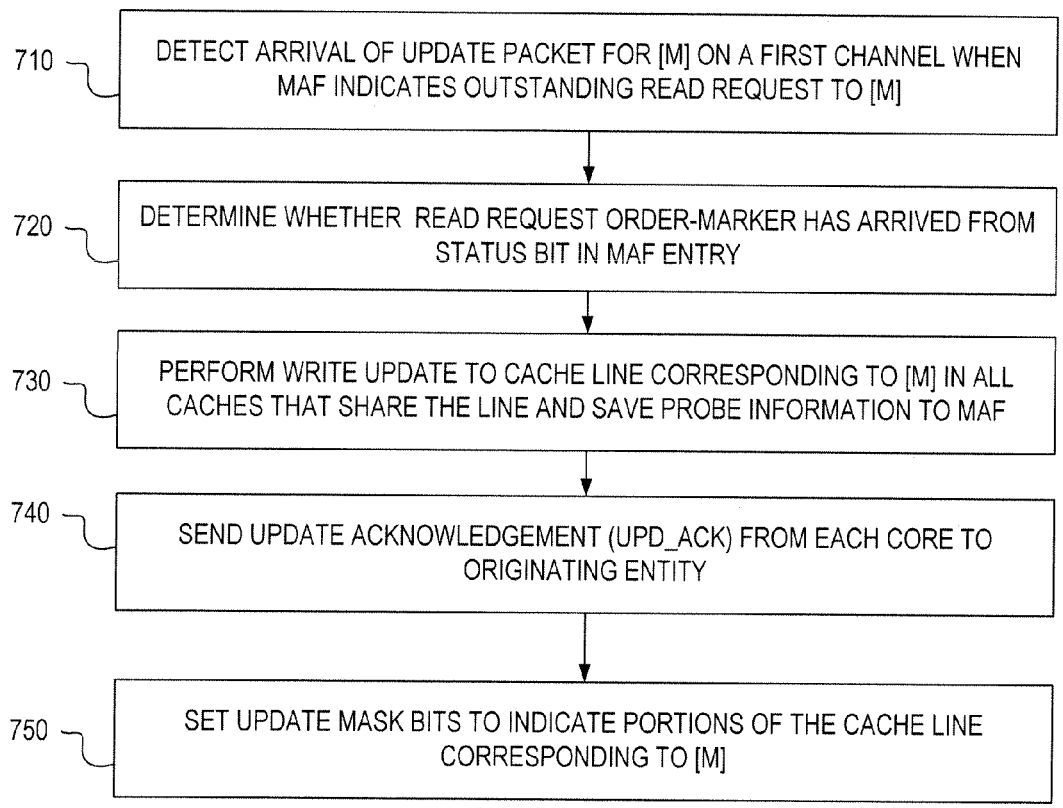
FIG. 7 is a flow diagram of a method to manage the order of update requests and update the set bit in the update mask.

FIG. 7 is a flow diagram illustrating an embodiment of the invention. Flow diagrams as illustrated here provide examples of sequences of various process actions. Although shown in a particular sequence or order, unless otherwise stated, the order of the actions can be modified. FIG. 7 is a flow diagram describing selected elements of an embodiment of method 700 to manage the order of update requests and update the set bit in the update mask is illustrated.

Disclosed method 700 is initiated by an outstanding read request to a specific memory address. In event sequence 710, detection is made of the arrival of an update packet for a specific memory address [M] on a first channel, wherein the MAF is indicative of an outstanding read request to the [M]. In event sequence 720 determination is made whether the read request order-marker has arrived from the status bit in MAF entry. This is indicative that the update packet was ordered after the read request and must be applied to the value obtained by the read. Next in event sequence 730, the write update is performed to the cache line corresponding to [M] in all caches that share the cache line. The probe information is saved to the MAF. In event sequence 740, an update acknowledgement is sent from each associated core to the originating entity of the update request. Event sequence 750 describes the update mask bits being set to indicate portions of the cache line corresponding to a specific memory address [M].

Figure 8:
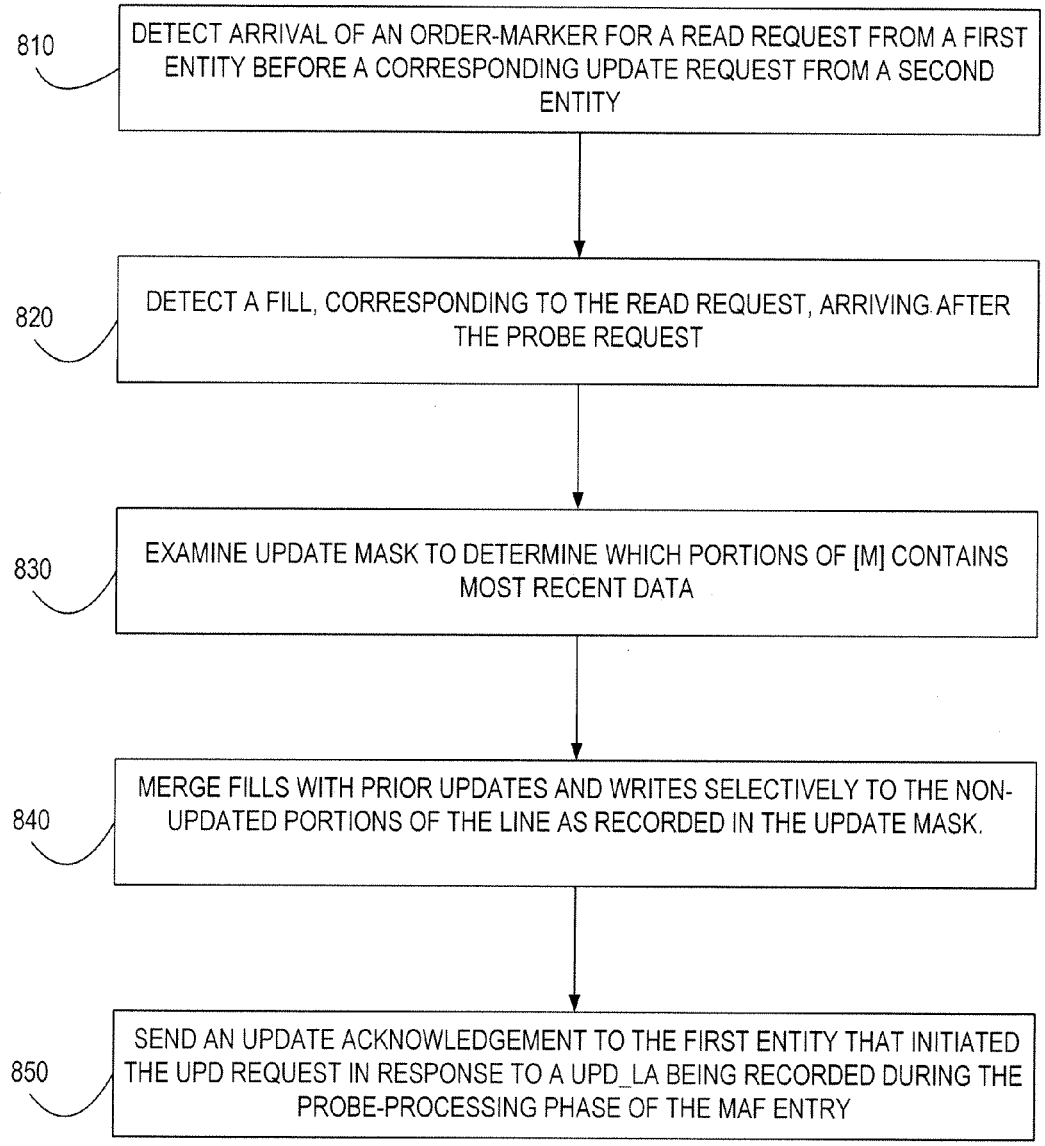
FIG. 8 is a flow diagram of a method to process fills arriving and manage subsequent updates.

FIG. 8 is a flow diagram describing selected elements of an embodiment of method 800 to process fills arriving and manage subsequent updates is illustrated. Disclosed method 800 is initiated by event sequence 810, wherein detection is made of the arrival of an order-marker for a read request from a first entity before a corresponding update request from a second entity. Event sequence 820 describes detection of a fill, corresponding to the read request, arriving after the probe request. The update mask is examined to determine which portions of the specific memory address [M] contains most recent data in event sequence 830. In event sequence 840, the fill is merged with prior updates and writes selectively to the non-updated portions of the line as recorded in the update mask. In event sequence 850, in response to a probe update has been recorded during the probe processing phase of the MAF entry, an update acknowledgement is sent to the first entity that initiated the update request that resulted in generating the probe update. This allows the order of processing of entries during in-flight chains of work on a specific memory address [M].

Figure 9:
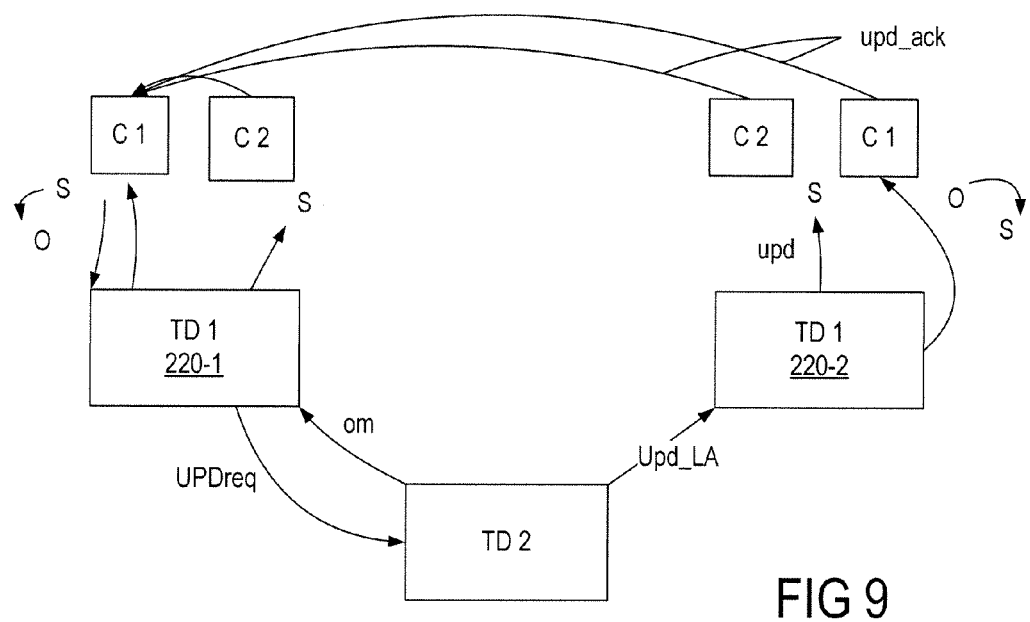
FIG. 9 is a block diagram representative of an update request across multiprocessors.

Referring now to FIG. 9, a block diagram representative of an update request across multiprocessors. The update request travels in the request channel to the corresponding TD 1 220. The domain state field is examined and indicates that there are other copies in other domains. The update request packet then continues on to TD 2. After winning arbitration at TD 2, using first-come first-served method of arbitration, an order-marker is sent back to the domain of the update request and a probe update is sent to the domain of the last accessor. The last accessor state of the TD 2 entry is changed to point to the domain of the update request. The order-marker returns to TD 1 and sends an update to the other copy in the domain, C2, and then changes the last accessor in TD 1 to point to the core that issued the update request and continues the order-marker towards the core that issued the update request. Once the order-marker returns to the originating core, the update is applied to the cache. The probe update arrives at the other domains TD1 and sends a probe update to the last accessor core in that domain and sends an update packet to any other core in that domain with a copy.

After each core performs its update, an update acknowledgement is sent back to the originating core. Once the originator receives all of the update acknowledgement packets and the order-marker packet, the state is transitioned to the O-state. It is to be noted, that any core in the O-state receiving an update will transition to S-state and the originating core will transition to the O-state.

Figure 10:
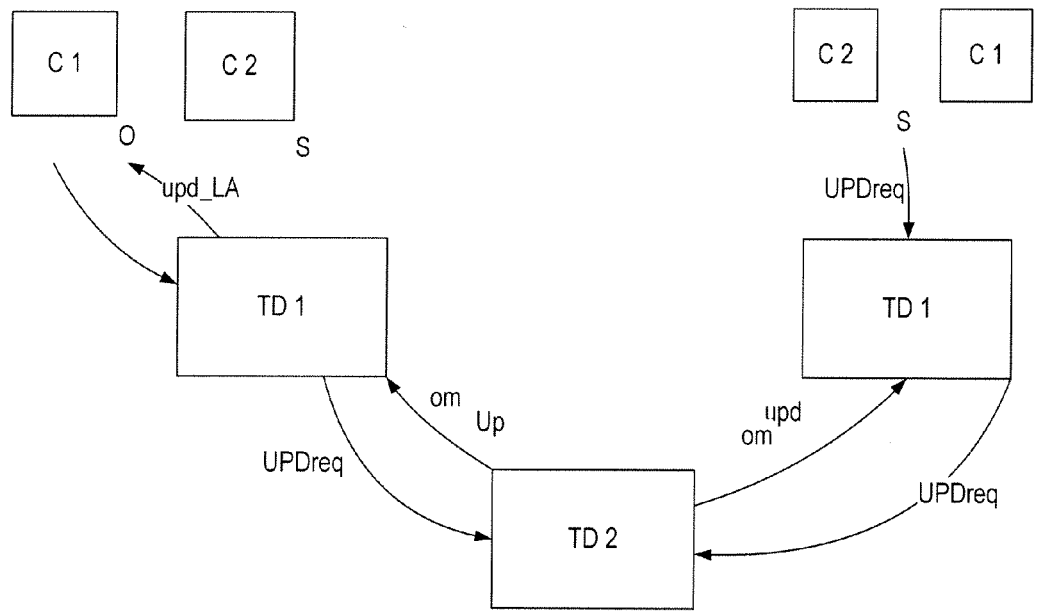
FIG. 10 is a block diagram representative of the ordering of multiple updates to the same specific memory address is performed at the tag directories.

Referring to FIG. 10, a block diagram representative of the ordering of multiple updates to the same specific memory address is performed at the tag directories is illustrated. Update request from the O-state version of the line wins arbitration first at TD 2 and results in an order-marker returning towards the domain of the O-state line, as well as, an update packet towards the other domain. It is to be noted, that the O-state line must be the last accessor. The update request from the S-state line wins arbitration at TD 2 after the first update request and follows the order-marker with a probe update towards the last accessor and an order-marker back to its own domain after the update packet. All updates arrive in coherent order determined by the tag directories and can be applied to any cache in that order.

Figure 11:
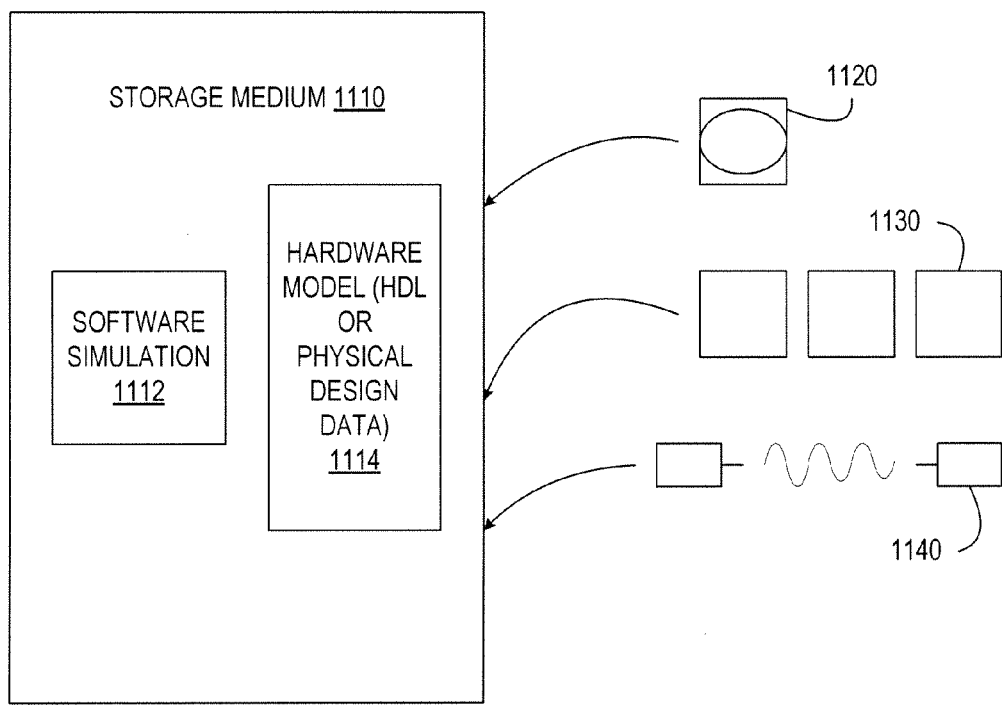
FIG. 11 illustrates a representation for simulation, emulation and fabrication of a design implementing the disclosed techniques.

Referring now to FIG. 11, a representation for simulation, emulation and fabrication of a design implementing the disclosed techniques. Data representing a design may represent the design in a number of manners. First, as is useful in simulations, the hardware may be represented using a hardware description language or another functional description language which essentially provides a computerized model of how the designed hardware is expected to perform. The hardware model 1114 may be stored in a storage medium 1110 such as a computer memory so that the model may be simulated using simulation software 1112 that applies a particular test suite to the hardware model 1114 to determine if it indeed functions as intended. In some embodiments, the simulation software 1112 is not recorded, captured or contained in the medium.

Additionally, a circuit level model with logic and/or transistor gates may be produced at some stages of the design process. This model may be similarly simulated, sometimes by dedicated hardware simulators that form the model using programmable logic. This type of simulation, taken a degree further, may be an emulation technique. In any case, reconfigurable hardware is another embodiment that may involve a tangible machine readable medium storing a model employing the disclosed techniques.

Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. Again, this data representing the integrated circuit embodies the techniques disclosed in that the circuitry or logic in the data can be simulated or fabricated to perform these techniques.

In any representation of the design, the data may be stored in any form of a tangible machine readable medium. An optical or electrical wave 1140 modulated or otherwise generated to transmit such information, a memory 1130, or a magnetic or optical storage 1120 such as a disc may be the tangible machine readable medium. Any of these mediums may "carry" the design information. The term "carry" (e.g., a tangible machine readable medium carrying information) thus covers information stored on a storage device or information encoded or modulated into or on to a carrier wave. The set of bits describing the design or the particular part of the design are (when embodied in a machine readable medium such as a carrier or storage medium) an article that may be sold in and of itself or used by others for further design or fabrication.

To the maximum extent allowed by law, the scope of the present disclosure is to be determined by the broadest permissible interpretation of the following claims and their equivalents, and shall not be restricted or limited to the specific embodiments described in the foregoing detailed description.

What is claimed is:

1. A method comprising:
    responsive to detecting a read request referencing a specific memory address from a first entity that misses in a core cache of the first entity:
        sending an order-marker corresponding to the read request to the first entity on a first channel;
        sending a fill corresponding to the read request to the first entity on a second channel; and
    responsive to detecting an update request from a second entity, ordered after the read request, referencing the specific memory address, the update request received in a second level tag directory of a multi-level tag directory hierarchy via a first level tag directory of the multi-level tag directory hierarchy:
sending, from the second level tag directory, a second order-marker to the second entity, via the first level tag directory;
sending update data packets on the first channel to all non-last accessor entities having copies of the specific memory address;
sending, from the second level tag directory, a probe update data packet on the first channel to a last accessor entity if the last accessor entity is different than the second entity and changing a last accessor state of an entry of the second level tag directory to point to the second entity; and
sending an update acknowledgement (upd_ack) to the second entity.

2. The method of claim 1, wherein the returned read request order-marker is to be associated with an address-ordered probe channel and the fill, corresponding to the read request, is associated with an un-ordered response channel.

3. The method of claim 1, wherein a bit in a miss address file indicates the read request order-marker has arrived.

4. The method of claim 1, wherein the update request sets bits in an update mask to indicate a portion of a cache line corresponding to a specific memory address that was updated.

5. The method of claim 2, responsive to the read request order-marker arriving before a probe request, preventing the fill from overwriting the updated data.

6. The method of claim 5, wherein the fill is merged with prior updates and writes to the non-update portions of the cache line.

7. The method of claim 1, wherein an update acknowledgement is sent to the first entity that initiated the update request if a probe request has been recorded during a probe processing phase of a miss address file entry.

8. A processor, comprising:
multiple cores, each with a front end, an execution unit, a core cache and a miss address file;
a last level cache;
a cache controller with a first level tag directory to:
responsive to detection of a read request referencing a specific memory address from a first entity that misses in a core cache of the first entity:
send an order-marker corresponding to the read request to the first entity on a first channel;
send a fill corresponding to the read request to the first entity on a second channel; and
responsive to detection of an update request from a second entity, ordered after the read request, referencing the specific memory address, the update request received in a second level tag directory of a multi-level tag directory hierarchy via a first level tag directory of the multi-level tag directory hierarchy:
send, from the second level tag directory, a second order-marker to the second entity, via the first level tag directory;
send update data packets on the first channel to all non-last accessor entities having copies of the specific memory address;
send, from the second level tag directory, a probe update data packet on the first channel to a last accessor entity if the last accessor entity is different than the second entity and change a last accessor state of an entry of the second level tag directory to point to the second entity; and
send an update acknowledgement to the second entity.

9. The processor of claim 8, wherein the returned read request order-marker is to be associated with an address-ordered probe channel and the fill, corresponding to the read request, is associated with an un-ordered response channel.

10. The processor of claim 8, wherein a bit in the miss address file indicates the read request order-marker has arrived.

11. The processor of claim 8, wherein the update request is to set bits in an update mask to indicate a portion of a cache line corresponding to a specific memory address that was updated.

12. The processor of claim 8, responsive to the read request order-marker arriving before a probe request, to prevent the fill from overwriting the updated data.

13. The processor of claim 12, wherein the fill is to be merged with prior updates and writes to the non-update portions of the cache line.

14. The processor of claim 8, wherein an update acknowledgement is sent to the first entity that initiated the update request if a probe request has been recorded during a probe processing phase of the miss address file entry.

15. A system, comprising:
an I/O hub to interface to a processor;
an I/O device to interface to the I/O hub;
the processor comprising multiple processing cores, each with a front end, an execution unit, a core cache and storage to a miss address file;
a last level cache;
a cache controller to:
respond to detection of a read request from a first entity referencing a memory address that misses in a core cache of the first entity to cause the system to:
send an order-marker corresponding to the read request to the first entity on a first channel;
send a fill corresponding to the read request to the first entity on a second channel; and
respond to detection of an update request from a second entity, ordered after the read request, referencing the specific memory address, the update request received in a second level tag directory of a multi-level tag directory hierarchy via a first level tag directory of the multi-level tag directory hierarchy to cause the system to:
send, from the second level tag directory, a second order-marker to the second entity, via the first level tag directory;
send update data (upd) packets on the first channel to all non-last accessor entities having copies of the specific memory address;
send a last accessor update (upd_LA) packet to a last accessor entity on the first channel if the last accessor entity is different than the second entity and change a last accessor state of an entry of the second level tag directory to point to the second entity;
send an update acknowledgement (upd_ack) to the second entity.

16. The system of claim 15, wherein the returned read request order-marker is associated with an address-ordered probe channel and the fill, corresponding to the read request, is associated with an un-ordered response channel.

17. The system of claim 15, wherein a bit in the miss address file indicates arrival of the read request order-marker.

18. The system of claim 15, wherein the update request is to set bits in an update mask to indicate a portion of a cache line corresponding to a specific memory address that was updated.

19. The system of claim 15, responsive to the read request order-marker arriving before a probe request, to prevent the fill from overwriting the updated data.

20. The system of claim 19, wherein the fill is to be merged with prior updates and writes to the non-update portions of the cache line.

21. The system of claim 15, wherein an update acknowledgement is sent to the first entity that initiated the update request if a probe request has been recorded during a probe processing phase of the miss address file entry.

* * * * *